UNITED STATES PATENT OFFICE.

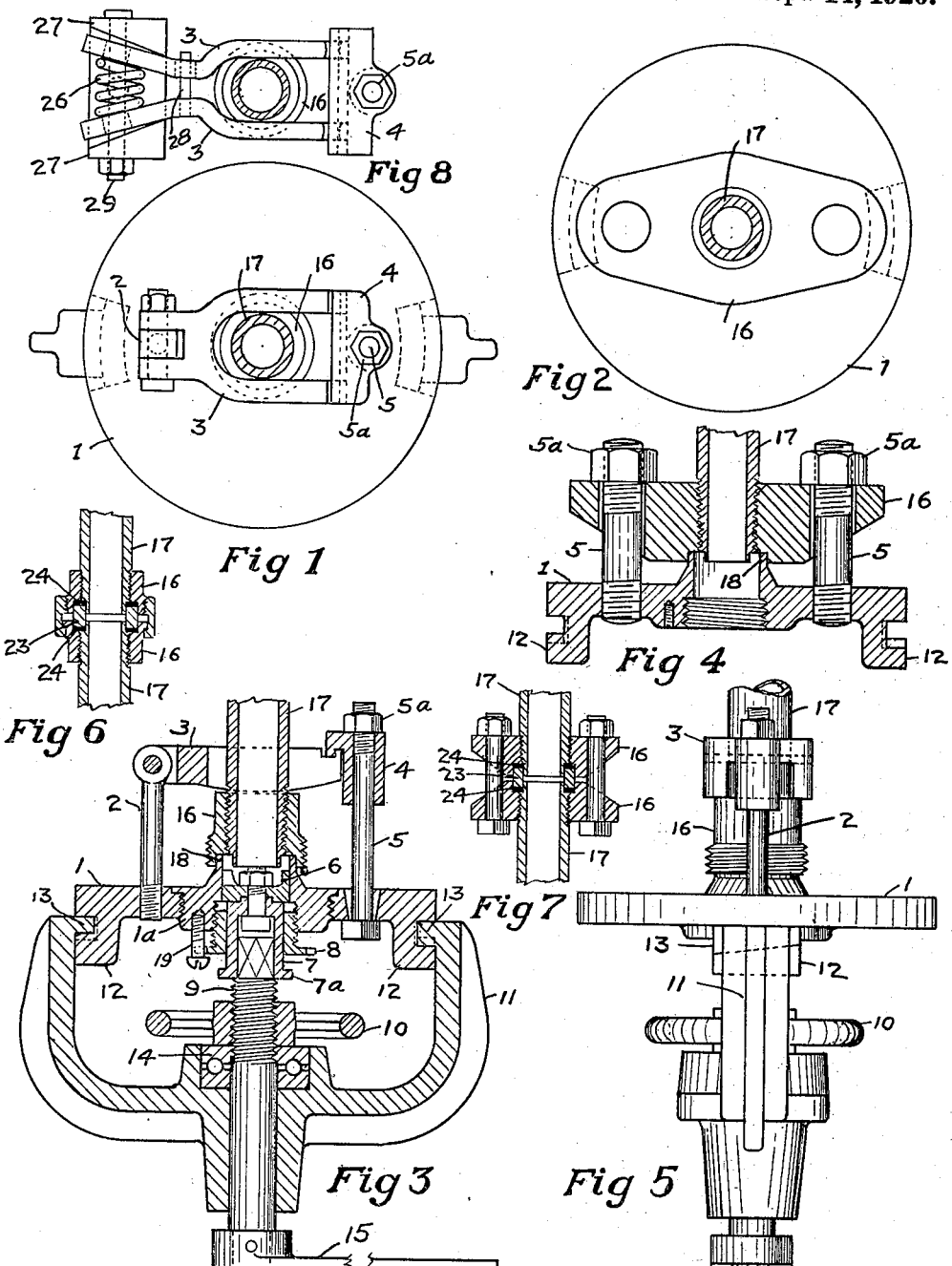

BENNET CARROLL SHIPMAN, OF SAN FRANCISCO, CALIFORNIA.

PIPE-JOINING DEVICE.

1,352,767.  Specification of Letters Patent.  Patented Sept. 14, 1920.

Application filed January 3, 1919, Serial No. 269,446. Renewed February 10, 1920. Serial No. 357,520½.

*To all whom it may concern:*

Be it known that I, BENNET CARROLL SHIPMAN, a citizen of the United States, residing in the city of San Francisco, county of San Francisco, State of California, have invented certain new and useful Improvements in Pipe-Joining Devices.

As is well known all joints depending on threads for tightness are subject to leaks, and ordinarily such leaks cannot be determined until the pipe work with these joints is installed. Then a great deal of expense and trouble must be incurred to remove such piping, often a difficult piece of work, in order to make the joints over again, with no more assurance that they are then tight than in the initial installation.

My invention provides a means of making an absolutely tight joint with the full assurance of not having to remove the work after installation. I am aware that the type of joint herein illustrated has been proposed before, but no adequate means have been invented to utilize such joints. In order that any means for this purpose shall be a success it demands that it must be capable of being applied on the job, perhaps remote from any machine shop facilities. To that end, I provide suitable joints, whether flanges, unions, valves, T's, L's, or other fittings such as are required in general use, adapted to be used in connection with my invention, and a portable tool for making up such joints in the field, to be used in a way similar to pipe threading tools.

Describing the figures briefly, Figure 1 is an end view of Fig. 3, showing the method of retaining the tool in position, and adapted to screwed unions. Fig. 2 is an end view of Fig. 4, showing another method of retaining the tool in position, and adapted to flanged unions. Fig. 3, is a sectional elevation of the tool in position after having performed its work on one half of a screwed union joint. Fig. 4 is a sectional elevation of part of the tool in position after having performed its work on one half of a flanged union joint. Fig. 5 is a side elevation of Fig. 3. Fig. 6 is a completed joint showing a screwed union. Fig. 7 is a completed joint showing a flanged union. Fig. 8, is a detail view of an adjustable type of yoke for attaching the tool to the pipe.

Describing the figures in detail like numbers referring in all cases to the same or similar parts, 1 is a guide plate to be attached to the joint which it is desired to prepare, by means of stud, 2, bifurcated yoke, 3, latch, 4 and bolt, 5. In Fig. 3, this yoke, 3, is shown braced against the back end of a union, and can be similarly applied to a flange union. In Fig. 4 it is shown bolted to an oval flange. The guide plate, 1, has a projection, 18, adapted to fit into the recess in the face of the union, which recess is part of the union as supplied from the factory. When the guide plate is so placed it is tightened into a firm position by means of the nut, 5ª, coöperating with bolt, 5. It should be understood that unions, as supplied, will be threaded and recessed as shown. It will be observed that this recess determines the position and alinement of the guide plate, by means of the projection, 18, seating in the recess. It will also be observed that this projection has a large enough bore to go over that portion of the pipe which may project through the union when the same has been screwed up tightly.

The purpose of the tool is to recess the end of the pipe similarly to the union. To that end a pipe is threaded as usual, except that no care need be taken in so doing, and no pipe compound used on either the pipe or union, in screwing the union on the pipe. The guide plate, carries a cutter, 6, preferably of tool steel, bolted to a carrier, 7, preferably of machine steel, or other cheaper material and having a square projection fitting into a corresponding socket in the cutter, 6, for the purpose of preventing any liability of the cutter slipping in reference to its carrier. The cutter is evidently guided by the bore of the guide plate. In order to feed the cutter, the carrier, 7, is provided with a square socket into which fits the end of the shaft, 9, and on the shaft, 9, is a feed wheel, 10, coöperating with a thread thereon, and thrusting against one element of a ball bearing, 14, which in turn is carried in a yoke, 11, the said yoke in Fig. 4 being attached to the guide plate by the wedge shaped lugs, 13, coöperating with the lugs, 12, on the guide plate. As it is necessary that the cutter should stop at the point when it has cut the recess in the pipe to the exact depth of the recess in the union, the carrier, 7, is provided with a projecting edge, 7ª, which is adapted to bring up against a stop, 8, when the cutter has reached its desired limit, thus preventing any further cutting action. In order that the stop, 8, may be adjusted to the proper point, it is threaded into a recess in the back of the guide plate, so that it may be screwed in or out, so as to take up any position desired to accommodate different cutters or to allow for the wear and sharpening of the cutter. To insure that the stop, 8, shall not change its position when once set, a retaining screw, 19, is provided, which engages with a notch in the projecting edge of the stop to prevent its turning. This edge of the stop has a series of such notches all the way around, so that the movement from one notch to the next will move the stop in or out very little.

The operation of the device is as follows:

A union of the design shown is screwed into place on the pipe, the thread of the pipe of course projecting through the union. The guide plate carrying the cutter, 6, cutter carrier, 7, and stop, 8, is then secured into place, by means of yoke, 3, and latch, 4, and tightened by means of bolt, 5, and nut, 5ª. The yoke, 11, is then secured to plate, 1, by means of lugs, 13, as already described, the shaft, 9, being entered in the socket in tool carrier, 7, at the same time. Adjustment of the feed wheel, 10, will then force the cutter against the pipe, if the handle, 15, is turned, until the projection, 7ª, of the carrier is forced up against the stop, 8. It is to be noted that the cutter should be of such shape as to leave a thin wall on the interior of the pipe for the retention of the gasket. Preferably, also, it should have a cutting edge which will cut down the whole pipe, if such pipe should project too far through the union.

In Figs. 6 and 7 are illustrated two types of joints utilizing my invention. It is to be noted that a pair of unions are recessed exactly the same, two gaskets, 24, being used with a ferrule, 23, between.

A variation of the arrangement is indicated in Fig. 3, by thread lines showing the separation of the guide proper, 1ª, from its retaining holder. This may be screwed in as shown or merely set into place, this being a detail of construction only. Such a separation of the guide, 1ª, from its retainer would be desirable for making a tool adapted to various sized pipes. In such a case also the clamping yoke would have to be made adaptable to various sized pipes. To that end, I show in Fig. 8, another form of yoke for this purpose. The stud, 2, is then made to terminate in lugs, 27, with their inner surfaces sloping to a throat. The yoke, 3, is made in two independent parts secured to the lugs 27 by means of a bolt, 29, and spread by a spring, 26. In order that both parts of the yoke shall move together a small stud, 28, permanently fastened in one half of the yoke projects through a slotted hole in the other half to insure unison of rotary motion about the bolt, 29, but allowing the yoke to be spread more or less to accommodate various sizes of pipe. The function of the spring, 26, in conjunction with the throat of the lugs, is to keep the yoke arms pressed closely against the pipe, whatever may be its size, so as to insure a firm bearing for the yoke against the back of the union. The yoke is finally secured in position by the latch, 4, and the bolt, 5, and nut, 5ª, as already described. In the case of making the tool adaptable to various sized pipes, it is desirable to make the yoke, 11, integral with the plate, 1, and dispense with the lugs, 13. In such a case, as before stated, when changing from one size pipe to another, it is only necessary to change the guide plate, 1ª, which carries the cutter tool, 6, tool carrier, 7, and limit stop, 8.

Having described my invention, I desire to secure by Letters Patent the following:

1. In a pipe joining device, the combination of a recessed union, with a tool adapted to be secured firmly to the pipe and to be seated in the recess of the union, and having a cutter movably mounted adapted to cut away the outside of the pipe to an extent transversely exceeding the depth of the thread on said pipe, and longitudinally equaling the depth of the recess in said union.

2. A pipe joining device comprising a recessed union on a pipe, a clamping means attachable thereto for securing a guiding means whose position is determined by said union, and a cutting means operating in said guiding means for producing a recess in the pipe.

3. A pipe joining device comprising a recessed union on a pipe, a guide plate attachable thereto, a cutting tool operable in said guide plate, adapted to cut a recess longitudinally in the end of the pipe, and means for limiting the depth of such recess to that in the union.

4. A pipe joining device comprising a recessed union on a pipe, means for attaching a cutting means thereto adapted to cut a longitudinally circular recess in the end of the pipe and means for alining said cutting means with the recess in the union.

5. A pipe joining device, comprising a recessed union on a pipe, a guide attachable thereto, a cutter movable rotatively and axially in said guide, and means for limiting the axial movement of such cutter to the depth of the recess in said union.

6. A pipe joining device comprising a recessed union on a pipe, a guide plate having a flange adapted to seat in the recess of said union, a bifurcated yoke attached by adjustable bolts to said guide plate and adapted to engage the back of the union, a cutter housed in said guide plate adapted to cut a recess in the end of the pipe radially to a depth below the bottom of the thread, and axially to a point equal to the bottom of the recess in the union and means for turning said cutter.

7. A pipe joining device comprising a recessed union on a pipe, a guide plate attachable thereto, a cutter in said guide adapted to recess the end of the pipe in alinement with the recess in said union, and an adjustable stop to said cutter limiting the depth of its travel longitudinally of the pipe.

8. A pipe joining device, comprising a recessed union on a pipe, a guide attachable thereto, a cutter in said guide adapted to recess the end of the pipe, a carrier attached to said cutter, having an extended flange at its rear end, an adjustable stop surrounding said carrier, threaded into the guide, and having an extended flange at its rear end with a series of notches in its periphery and a retaining screw, threaded into the guide, adapted to fit against one of the notches.

9. A pipe joining device comprising a recessed union on a pipe, a guide attachable thereto, a cutter in said guide adapted to recess the end of the pipe, a yoke adapted to be attached to the said guide, and a shaft with a feed wheel, on said yoke, adapted to connect with said cutter when said yoke is attached to said guide.

10. A pipe joining device comprising a recessed joint-forming element screwed on a pipe, a guide attachable thereto and seating in the recess of said element, a cutter operable in said guide adapted to recess the end of the pipe in alinement with the recess in said element, a yoke adapted to be attached to and removable from said guide, and a shaft with a feeding mechanism mounted in said yoke adapted to connect simultaneously with the cutter when the yoke connects with the guide.

11. A pipe joining device comprising a recessed union screwed on the pipe to be connected, a removable guide seating on a finished surface of said union, a cutter in said guide adapted to recess the end of the pipe in conformity with the recess of the union, a frame, a shaft and feeding means attached removably to said guide, and an adjustable yoke for attaching and retaining the whole mechanism to the pipe and recessed union comprising a member adjustable as to length terminating in a pair of wedge shaped lugs in which are loosely secured one end of two arms separated by a spring, the said arms being relatively connected, and adapted to straddle various sized pipes, and at their other end to engage a latch carried on a member, also, adjustable as to length.

BENNET CARROLL SHIPMAN.

Witnesses:
L. B. SHAFFER,
N. M. BOYNTON.